Jan. 22, 1952     M. FUNKHOUSER     2,583,169

TWO-WAY VALVE

Filed March 12, 1948

INVENTOR.
MEARICK FUNKHOUSER
BY
HIS    ATTORNEYS

Patented Jan. 22, 1952

2,583,169

UNITED STATES PATENT OFFICE 2,583,169

TWO-WAY VALVE

Mearick Funkhouser, Dayton, Ohio, assignor to General Motors Corporation, Detroit, Mich., a corporation of Delaware Application March 12, 1948, Serial No. 14,489

5 Claims. (Cl. 277—45)

This invention relates to improvements in two directional, fluid flow control devices.

It is among the objects of the present invention to provide a two directional, fluid flow control device of simple and sturdy structure and design capable of differentially controlling fluid flow therethrough in opposite directions.

A further object of the present invention is to provide a two way fluid flow control mechanism consisting of a minimum number of parts and capable of silent operation and with minimum vibration.

Further objects and advantages of the present invention will be apparent from the following description, reference being had to the accompanying drawings wherein a preferred embodiment of the present invention is clearly shown.

Figure 1:
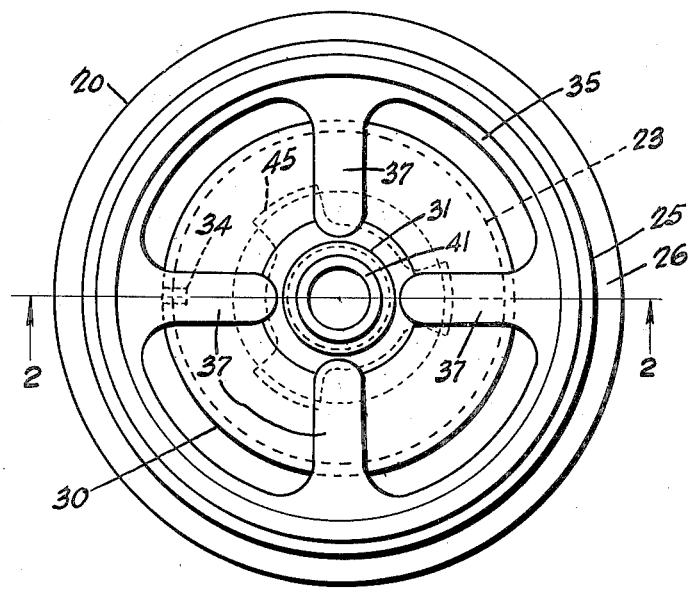
Fig. 1 is a plan view of the valve mechanism.
Figure 3:
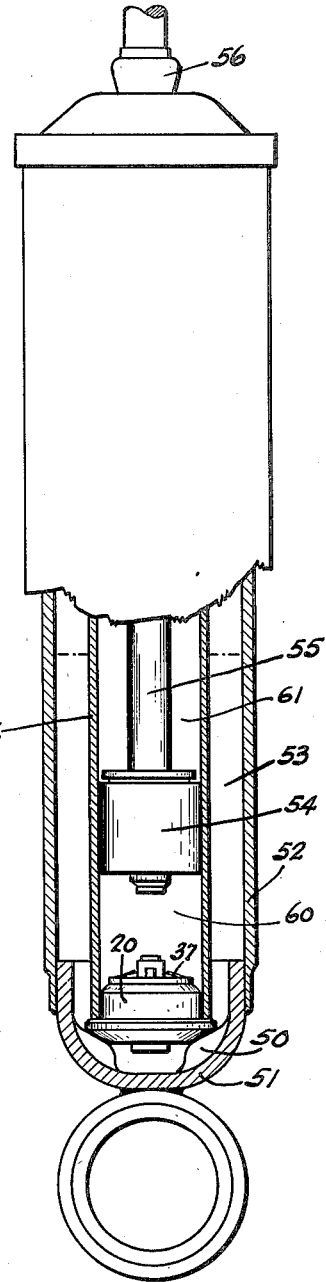
Fig. 3 shows the valve mechanism of the present invention applied to a direct acting type, hydraulic shock absorber for which it is particularly adapted.

Referring to the drawings the two way valve mechanism of the present invention is operative differentially to control fluid flow in opposite directions. It is particularly adapted to be used in a direct acting type hydraulic shock absorber as shown in Fig. 3. The mechanism comprises a valve cage 20 having a central opening 21 therethrough and a recess 22 in its one end. An annular ridge 23 in the bottom surface of this recess surrounds the opening 21 and provides a valve seat. The valve cage has provisions to fit into the tubular member or cylinder 24 of a direct acting type hydraulic shock absorber. This comprises an annular wall 25 on the valve cage adapted snugly to fit into the cylinder 24. An outwardly extending flange 26 provides a shoulder which engages the edge of the cylinder 24 when the valve mechanism is placed into the position as is shown in Fig. 3.

Figure 2:
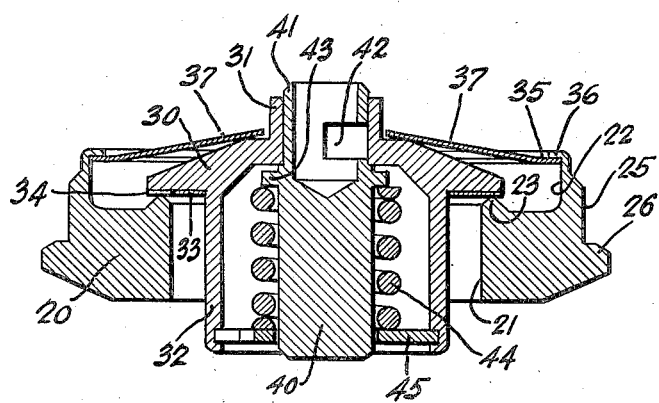
Fig. 2 is a transverse section taken along the line and in the direction of the arrows 2—2 of Fig. 1.

The two way valve mechanism of the present invention comprises also a centrally apertured disc valve 30 termed "the intake valve" said disc valve having concentric tubular portions 31 and 32 oppositely disposed and extending from each side of the disc valve. The tubular portion 31 is of the same inside diameter as the central opening in the disc valve 30 while the tubular portion 32, which extends through the opening 21 of the valve cage 20, is of comparatively lesser diameter than said opening so as to provide clearance between the outer wall of the tubular portion 32 and the inner surface of the opening 21 in the valve cage. The disc valve 30, as shown in Fig. 2, has a ring-shaped plate 33 fitting about its larger diameter cylindrical extension 32, this plate forming the contacting surface of the disc-valve 30 engageable with the valve-seat 23. A notch 34 in said plate provides a constantly open fluid flow orifice adapted to permit a restricted fluid flow before said valve is moved from its seat.

A spring disc of any suitable resilient, sheet metal comprises a ring-shaped frame portion 35 fitting into the recess 22 of the valve cage and secured therein by swaging the edge 36 of the valve cage inwardly and over the ring portion 35. Extending inwardly and radially from said frame portion 35 are a plurality of resilient fingers 37, the inner ends of said fingers terminating short of the tubular portion 31 of the disc valve 30, the spring fingers being biased so that said fingers 37 will be pressed against the disc valve 30 at a predetermined pressure. This pressure is attained by predeterminately swaging the portion 36 of the valve cage 20 over and upon the ring portion 35 of the spring until the desired pressure by fingers 37 upon the disc valve 30 is attained. Thus the disc valve 30 is yieldably urged upon its valve seat 23 in the valve cage by the resilient fingers 37 which, having their inner ends in close proximity to the tubular portion 31 of said disc valve, providing thereby a guide to maintain said disc valve substantially concentric with the annular valve seat 23. This assures complete coverage of the opening 21 by said disc valve at all times said valve is seated upon the ridge. This spring with its ring portion 35 and radial fingers 37 not only urges the valve toward its seat but also provides a pilot for valve 30 and also limits its movement away from its seat 23.

A plug valve 40 has a tubular end portion 41 which is slidably carried in the tubular portion 31 of the disc valve. The annular wall of the tubular portion 41 of the plug valve 40 has a slot 42 cut in one side thereof, this slot normally lying within the confines of the tubular portion of the disc valve 30 and thereby being normally closed. An outwardly extending annular flange 43 is provided on the valve plug 40 said flange engaging the inner surface of the disc valve 30 and being urged into such engagement by a spring 44 which surrounds the plug valve 40 and is interposed between the flange 43 thereof and an abutment spider 45 secured within the tubular portion 32 adjacent its outer end. The plug valve 40 extends through an opening in the abutment spider 45 thus said spider acts not only as an abutment for spring 44 but also as a guide for the plug valve 40.

In the Fig. 3 the valve mechanism is shown inserted in the bottom end of the cylinder 24, said valve mechanism resting upon radial ribs 50 within the closure member 51 which is secured to the outer tubular member 52 of the shock absorber surrounding the cylinder 24 and forming the reservoir chamber 53. The shock absorber has a piston 54 in its cylinder 24, a piston operating rod 55 being attached to the piston 54 and to the one relatively movable member 56 of the shock absorber which is adapted to be secured to one of the relatively movable members which the shock absorber is adapted to control. The other relatively movable portion of the shock absorber comprising the shoulder 24 and outer casing 52, its end cap 51 and the attached mounting ring 56 are all connected with the other relatively movable member to be controlled. Piston 54 is provided with any suitable fluid flow control mechanism adapted to provide for the transfer of fluid from one side of the piston to the other as it is reciprocated.

As the piston is moved downwardly in the cylinder 24 it exerts a pressure upon the fluid displacement chamber 60 urging some of the fluid into the piston opposite the displacement chamber 61 which due to the presence of the rod 55 therein cannot receive all of the fluid displaced from chamber 60. Consequently the fluid, not receivable by chamber 61, exerts a pressure upon the plug valve 40 of the two way valve mechanism, moving said plug valve 40 relatively to the disc valve 30 against the effect of spring 44 so that the flange 43 of the plug valve is moved from engagement with the disc valve 30 and the slot 42 in the side wall of the tubular portion 41 of the plug valve 40 is moved outside the confines of said tubular portion 41 thereby establishing a restricted fluid flow through portion 41, its slot 42 and then through the tubular extension 32 of the disc valve into the cup shaped end 51 of the shock absorber and from there into the reservoir 53. As soon as the fluid pressure upon the plug valve 40 is reduced or eliminated, the spring 44 returns it to its normal position in which the flange 43 engages the disc valve 30, in which position the side slot 42 in said plug valve is again within the confines of the tubular portion 41 of the disc valve 30 thereby shutting off fluid flow through the plug valve.

As the piston 54 moves upwardly in the cylinder 24 pressure upon the fluid in chamber 61 will cause its displacement through the piston 54 into the chamber 60. The amount of fluid in chamber 61 is not sufficient completely to fill the requirements of the chamber 60 now being enlarged, thus the disc valve 30 will be lifted from its seat 23 in the valve cage 20 against the effect of the resilient fingers 37 of the spring element thereby permitting fluid to flow from the reservoir 53 through the cup-shaped end member 51 thence through the opening 21 in the valve cage past the valve 30 now off its seat into the chamber 60 thereby providing sufficient fluid to satisfy the demands of the increasing chamber 60 as the piston 54 moves upwardly.

The present valve mechanism is comparatively silent inasmuch as vibrations during operation are practically eliminated. The provision of the side slot 42 in the plug valve 41 will, when the valve is moved from its seat by fluid pressure in chamber 60, cause a one sided discharge from the plug valve into the confines of the tubular portion 32 of the disc valve thereby setting up a reactive force which tends to urge the plug valve to one side maintaining it there due to the one sided discharge of the pressure under fluid thereby practically eliminating the possibility of any vibrations by this valve due to fluid pressure acting thereupon to open it.

The amount of bias given the spring fingers 37 and therefore the pressure at which said fingers urge valve 30 upon its seat 23 is governed by the swaging of edge 36 over the ring portion 35 of the spring. The greater the swage over of edge 36, the greater the pressure of spring fingers 37 upon valve 30.

The spring with its fingers 37 and ring portion 35 not only limits the movement of valve 30 from its seat 23 by acting as a positive stop but said fingers also pilot the movement of said valve and keep it substantially concentric of the opening 21 in the valve cage especially when seated upon said cage.

From the aforegoing it may be seen that the present invention provides a valve of simple structure and design, consisting of a minimum number of parts and adapted to provide fluid flow control in two directions.

While the embodiments of the present invention constitute a preferred form, it is to be understood that other forms might be adopted, all coming within the scope of the claims which follow.

What is claimed is as follows:

1. A two way valve mechanism comprising in combination, a centrally apertured valve cage having an annular ridge providing a valve-seat surrounding one end of the aperture; a disc valve normally resting upon said valve-seat, said disc valve having a central opening and tubular portions extending from each side thereof; a spring comprising a frame portion secured to the valve cage and resilient fingers extending from the frame, biased to engage and urge the disc-valve upon its seat at a predetermined pressure; the ends of the fingers terminating in close proximity to the one tubular extension on the valve for maintaining it central of the valve-seat; a plug valve slidably supported in said one tubular extension, normally closing the central opening in the disc valve but movable to establish a restricted flow therethrough; an abutment spider carried by the other tubular extension of the disc-valve; and a spring interposed between the spider and plug valve yieldably urging said plug valve to close the opening in the disc-valve.

2. A two way valve mechanism comprising in combination, a valve cage having a central opening; a disc-valve resting upon one side of the valve-cage to close its opening, said disc valve having a central opening and a tubular portion of the same internal diameter as the opening extending from one side of the disc valve and a larger diameter, cylindrical portion extending from the opposite side of the valve and through the valve-cage opening; a spring disc comprising a comparatively stiff, ring shaped frame portion having resilient fingers extending radially inwardly, the frame being secured to the valve-cage to bias the fingers against the disc-valve and urge it upon the valve-cage at a predetermined pressure, the ends of the respective fingers forming a guide for said disc valve to keep it substantially central of the valve-cage when seated thereupon, the portion of the fingers adjacent the frame providing substantially stiffer areas engaged by the valve for restricting the movement of the valve away from the valve-cage; a plug valve slidably supported in the central opening of the disc-valve, normally closing it but movable therein toward the larger diameter extension of said disc valve to permit fluid flow through said opening; an abutment spider supported by said larger diameter extension; and a spring interposed between the plug valve and abutment spider, yieldably urging the plug valve to close the opening in the disc valve.

3. A two-way valve mechanism comprising in combination, a valve-cage having a central opening; an annular ridge on one side of the cage, surrounding the opening and forming a valve-seat; a disc-valve having a central opening and a cylindrical portion of the same internal diameter as the valve opening extending from its one side and a larger diameter cylindrical portion extending from its opposite side and through the valve-cage opening; a ring shaped plate fitting about the larger diameter cylindrical extension of the disc-valve, providing the engaging surface of said valve adapted to seat upon the valve seat, said plate having a notch forming a constantly open orifice when the valve plate engages the valve seat; a spring disc comprising a ring shaped frame having integral, radially inwardly extending, resilient fingers the inner ends of which form a guide to maintain the valve substantially concentric of the valve-seat particularly when resting upon it; means for attaching the spring disc to the valve-cage to bias the resilient fingers against the valve so that said fingers urge it and its ring plate upon the valve seat at a predetermined pressure; a valve plug normally closing the central opening in the disc-valve and movable into the larger diameter cylindrical extension on said disc-valve to open said central opening; an abutment member in said larger cylindrical extension of the disc-valve; and a coil spring interposed between said member and plug-valve yieldably urging the latter to close the opening in the disc-valve.

4. A two way valve mechanism comprising in combination, a centrally apertured valve-cage; a compound valve, one portion of which provides a disc-valve engaging the valve-cage to cover its aperture, said disc-valve having a central opening surrounded by a tubular extension normally closed by a sleeve-valve telescopically fitting into the central opening and its surrounding tubular extension; resilient fingers secured to and extending radially from the valve-cage, said fingers engaging and yieldably urging the disc-valve upon the valve-cage, the more adjacent ends of said fingers terminating in close proximity to the tubular extension for maintaining the disc-valve centrally of the aperture in the valve cage; and a spring yieldably urging the sleeve-valve to close the central opening in the disc-valve.

5. A two-way valve mechanism comprising in combination, a valve-cage, apertured centrally; a compound valve consisting of oppositely acting intake and pressure relief valves, the intake valve comprising a disc-like portion having a central opening and adapted to rest upon the valve-cage to cover the aperture therein, said portion having a tubular extension surrounding the opening, the pressure relief valve having a portion telescopically fitting into the central opening in the intake valve normally to close it; spring fingers having their outer ends secured to the valve cage and extending radially inwardly thereof to engage and bias the intake valve upon the valve-cage, the inner ends of said fingers terminating near the tubular extension on the intake valve and acting as guides to hold the intake valve substantially central of the valve-cage aperture; and a spring supported by the intake valve and engaging the pressure relief valve, yieldably uring said relief valve to close the opening in the intake valve.

MEARICK FUNKHOUSER.

REFERENCES CITED

The following references are of record in the file of this patent:

UNITED STATES PATENTS

| Number | Name | Date |
| --- | --- | --- |
| 742,828 | Brown | Nov. 3, 1903 |
| 1,930,568 | Short | Oct. 17, 1933 |
| 1,973,258 | Jensen | Sept. 11, 1934 |
| 1,983,064 | Bates | Dec. 4, 1934 |
| 2,159,289 | Nickelson | May 23, 1939 |
| 2,310,913 | Tabb | Feb. 9, 1943 |
| 2,467,098 | Rossman | Apr. 12, 1948 |

FOREIGN PATENTS

| Number | Country | Date |
| --- | --- | --- |
| 606,816 | France | of 1926 |
| 777,489 | France | of 1934 |
| 598,595 | Great Britain | of 1948 |